United States Patent
Yamada

(10) Patent No.: US 12,330,684 B2
(45) Date of Patent: Jun. 17, 2025

(54) VEHICLE CONTROL INTERFACE, VEHICLE, AND CONTROL METHOD FOR VEHICLE

(71) Applicant: TOYOTA JIDOSHA KABUSHIKI KAISHA, Toyota (JP)

(72) Inventor: Kenichi Yamada, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 180 days.

(21) Appl. No.: 18/104,609

(22) Filed: Feb. 1, 2023

(65) Prior Publication Data
US 2023/0331258 A1  Oct. 19, 2023

(30) Foreign Application Priority Data

Apr. 14, 2022 (JP) ................................ 2022-066930

(51) Int. Cl.
*B60W 60/00* (2020.01)
*B60W 50/10* (2012.01)

(52) U.S. Cl.
CPC ........ *B60W 60/0018* (2020.02); *B60W 50/10* (2013.01); *B60W 2510/186* (2013.01)

(58) Field of Classification Search
CPC ............ B60W 60/0018; B60W 50/10; B60W 2510/186; B60W 2540/215; B60W 50/12; B60W 60/0051; B60W 60/007; B60W 60/001; B60W 30/182; B60W 60/0053; B60W 2050/0005; B60W 2050/007; B60Y 2304/076; B60R 16/02
See application file for complete search history.

(56) References Cited

U.S. PATENT DOCUMENTS

| 5,448,479 A | * | 9/1995 | Kemner | G05D 1/0061 |
| | | | | 701/2 |
| 2017/0316254 A1 | * | 11/2017 | Hariri | G06V 40/172 |
| 2018/0297555 A1 | * | 10/2018 | Simon | B62D 5/001 |

(Continued)

FOREIGN PATENT DOCUMENTS

| JP | 2018-090220 A | 6/2018 |
| JP | 2019-177807 A | 10/2019 |

(Continued)

*Primary Examiner* — James J Lee
*Assistant Examiner* — Alexander George Matta
(74) *Attorney, Agent, or Firm* — Dinsmore & Shohl LLP

(57) ABSTRACT

A vehicle control interface includes: a memory in which a program including a predetermined API defined for each of signals is stored; and a processor configured to perform interfacing between an autonomous driving system and a vehicle platform by executing the program. The vehicle platform is configured to be activated in response to one of a first and second activation commands. The first activation command is a command transmitted from the autonomous driving system to the vehicle platform via the vehicle control interface. The second activation command being a command in response to a manual operation on the vehicle platform. The processor is configured to, when the vehicle platform is activated in response to the first activation command, reduce effectiveness of the manual operation on the vehicle platform compared to when the vehicle platform is activated in response to the second activation command.

17 Claims, 9 Drawing Sheets

(56) References Cited

U.S. PATENT DOCUMENTS

| | | |
|---|---|---|
| 2019/0061777 A1 | 2/2019 | Lin |
| 2019/0122464 A1* | 4/2019 | DeLong ................. B60R 25/20 |
| 2019/0210544 A1* | 7/2019 | Gowda ............... B62D 15/027 |
| 2019/0285173 A1 | 9/2019 | Chiba |
| 2019/0300008 A1 | 10/2019 | Ando |
| 2020/0331482 A1* | 10/2020 | Schiemenz ........ G01C 21/3453 |
| 2021/0053590 A1 | 2/2021 | Namba |
| 2021/0061312 A1 | 3/2021 | Wang |
| 2021/0101587 A1 | 4/2021 | Ide et al. |
| 2021/0237765 A1 | 8/2021 | Ando |

FOREIGN PATENT DOCUMENTS

| | | |
|---|---|---|
| JP | 2020-038585 A | 3/2020 |
| JP | 2020-042853 A | 3/2020 |
| JP | 2020-060987 A | 4/2020 |
| JP | 2021-033467 A | 3/2021 |
| JP | 2021-059166 A | 4/2021 |
| JP | 2021-123135 A | 8/2021 |

* cited by examiner

<POWER MODE>

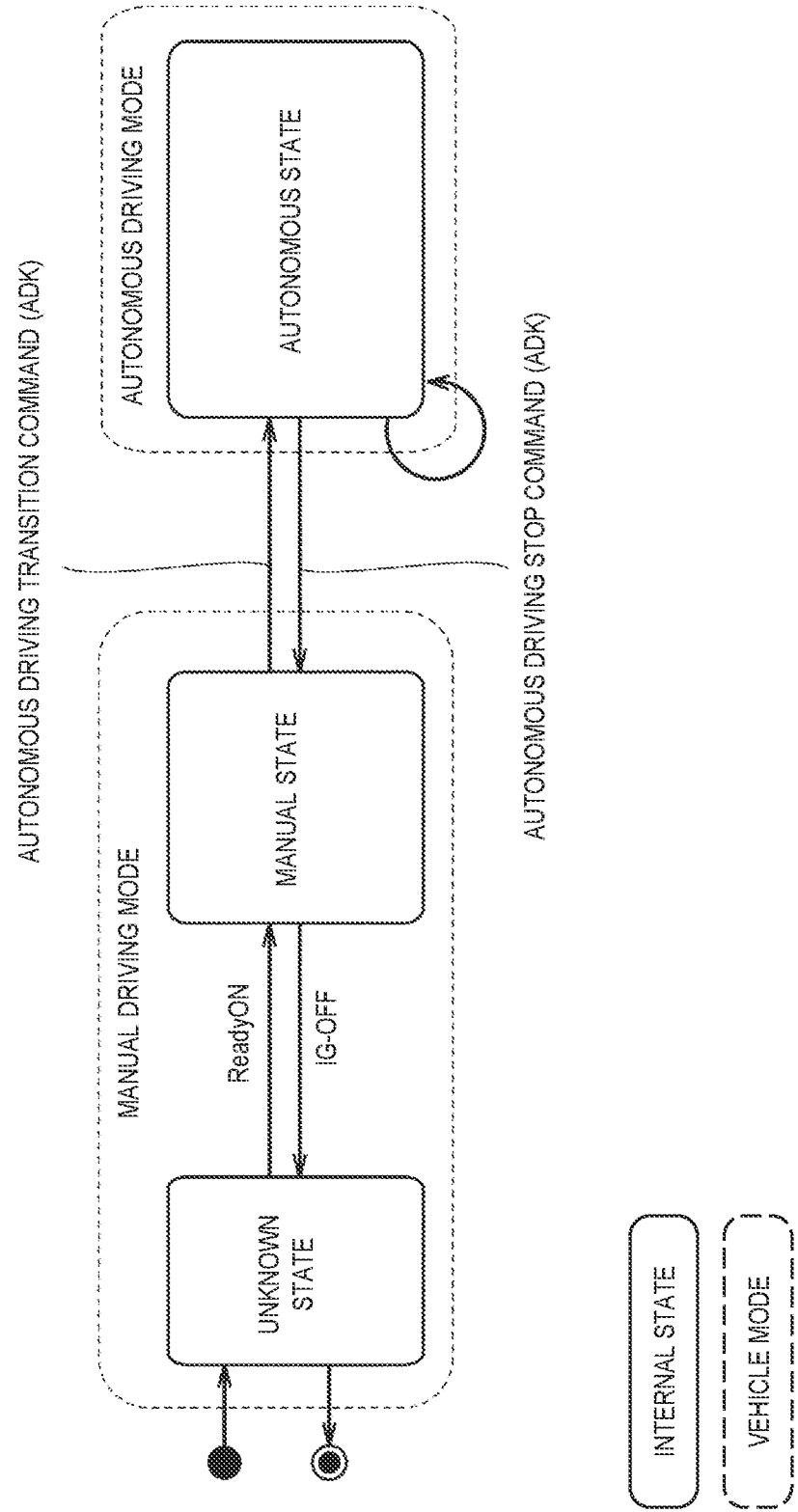

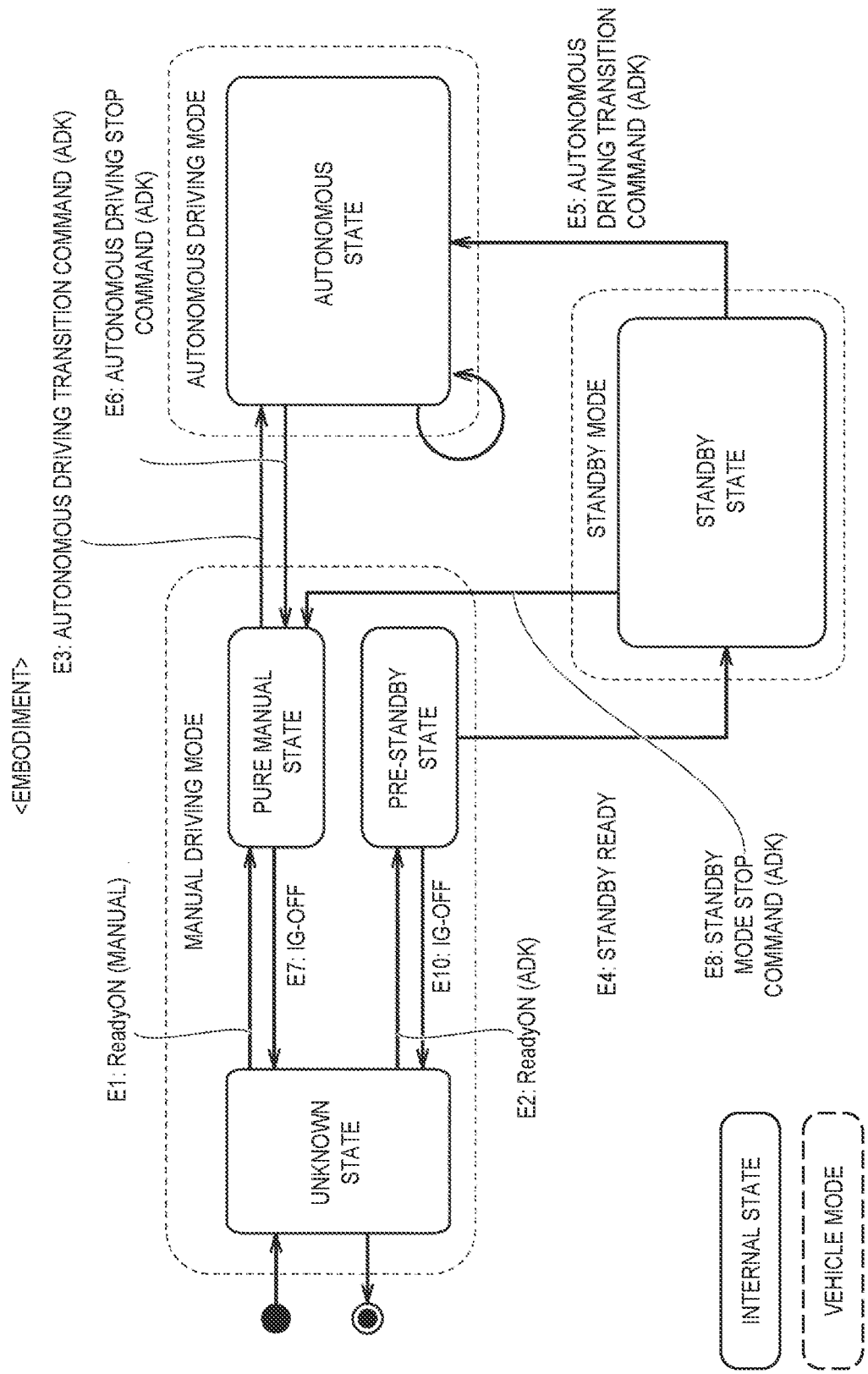

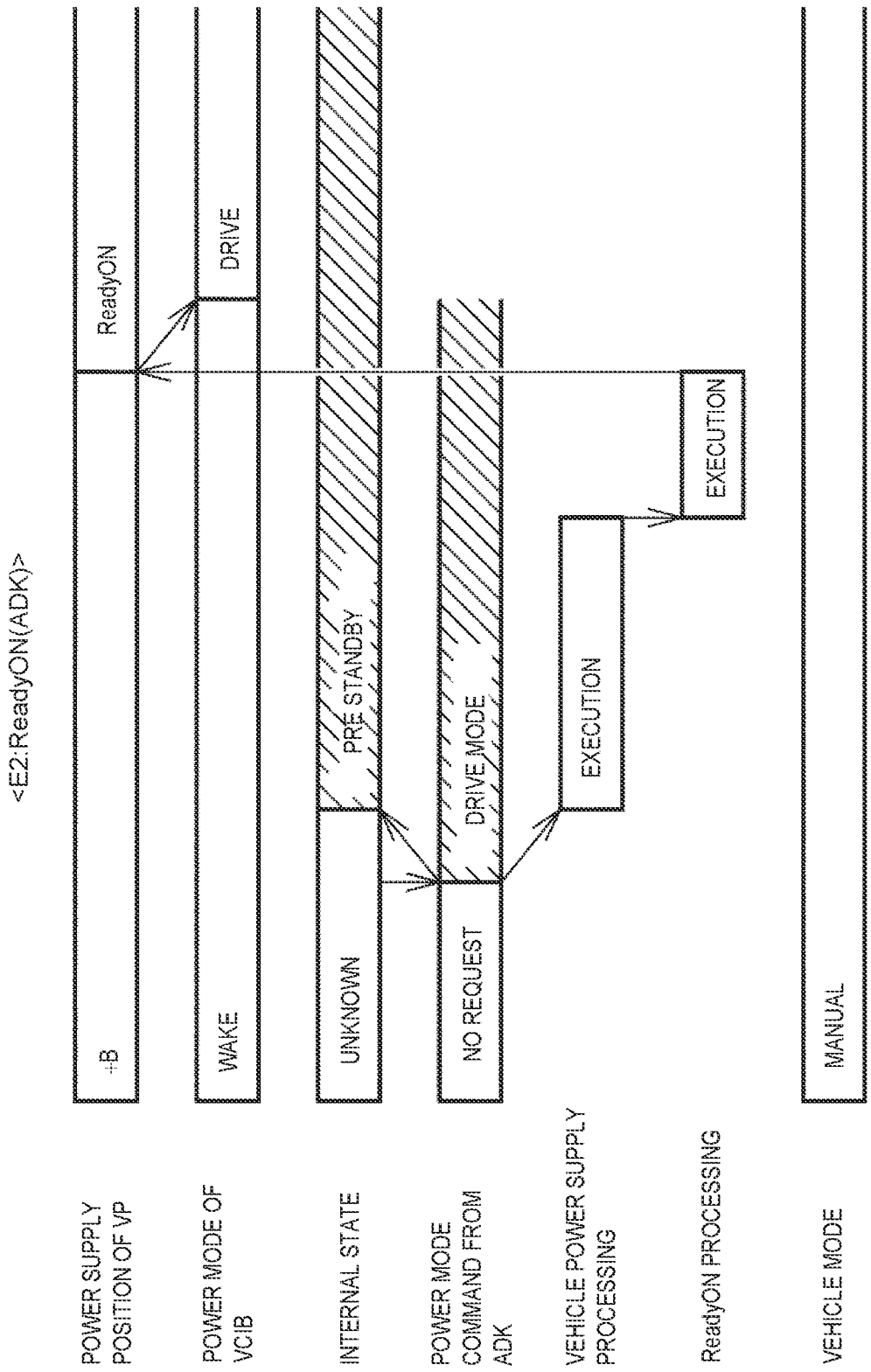

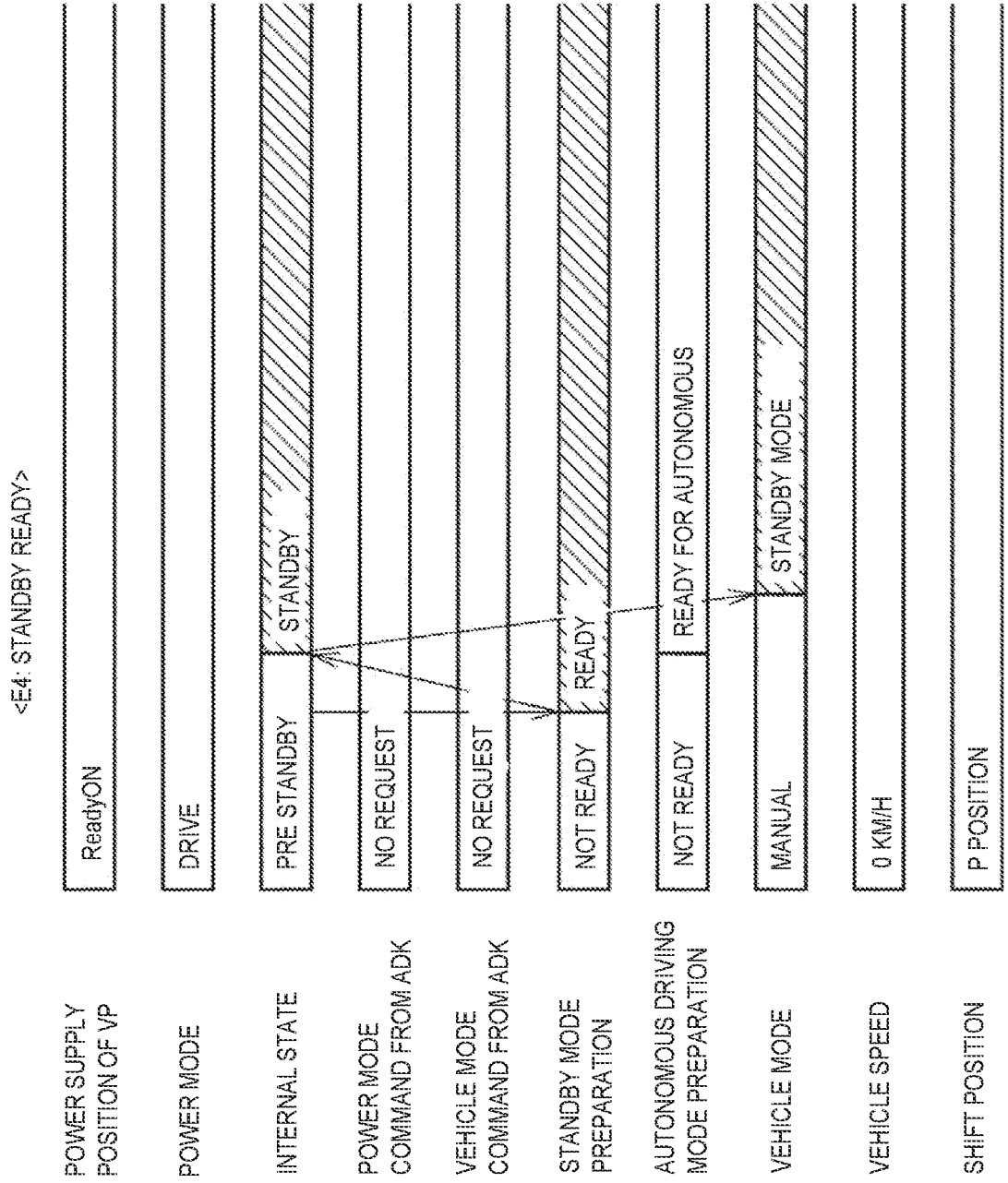

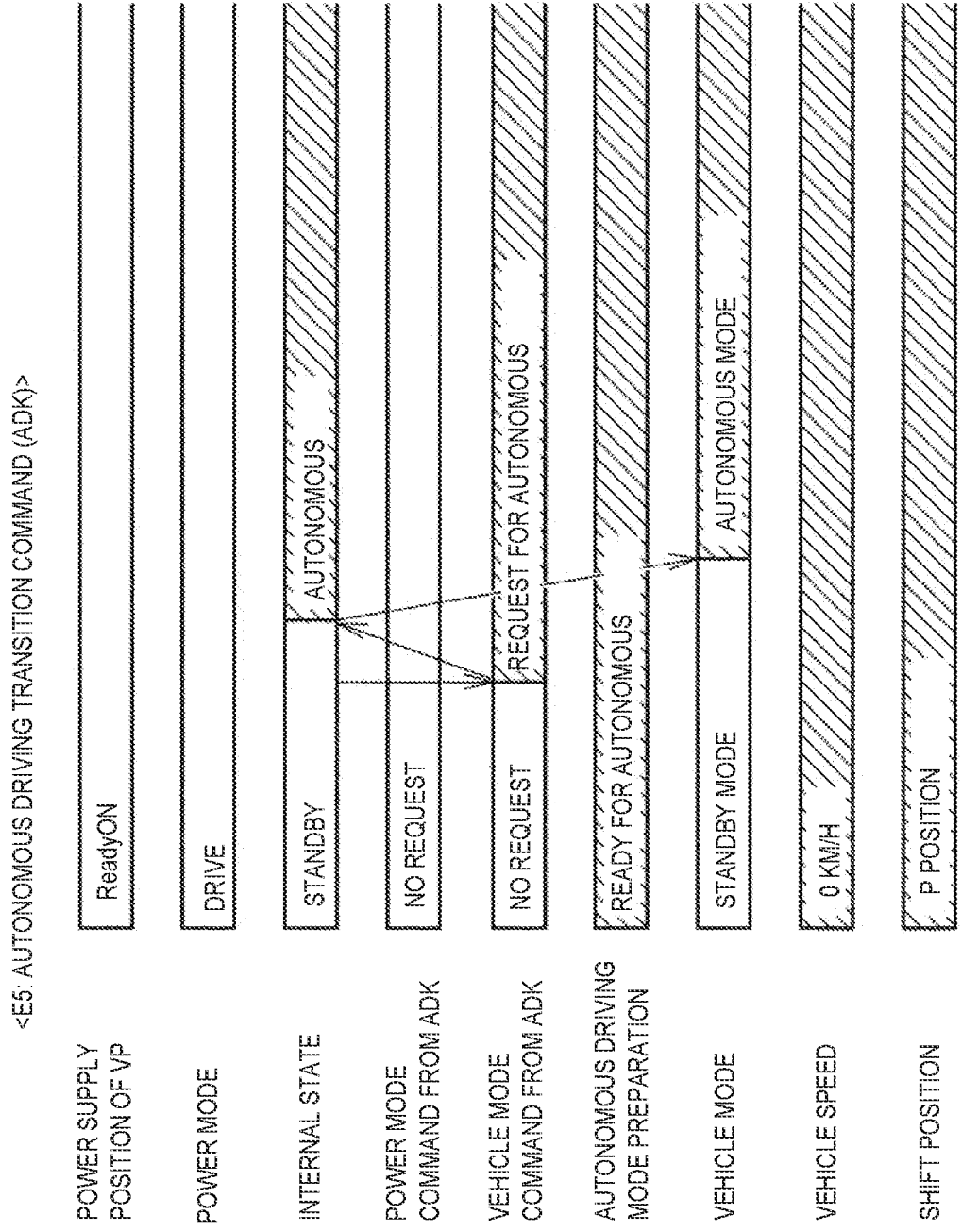

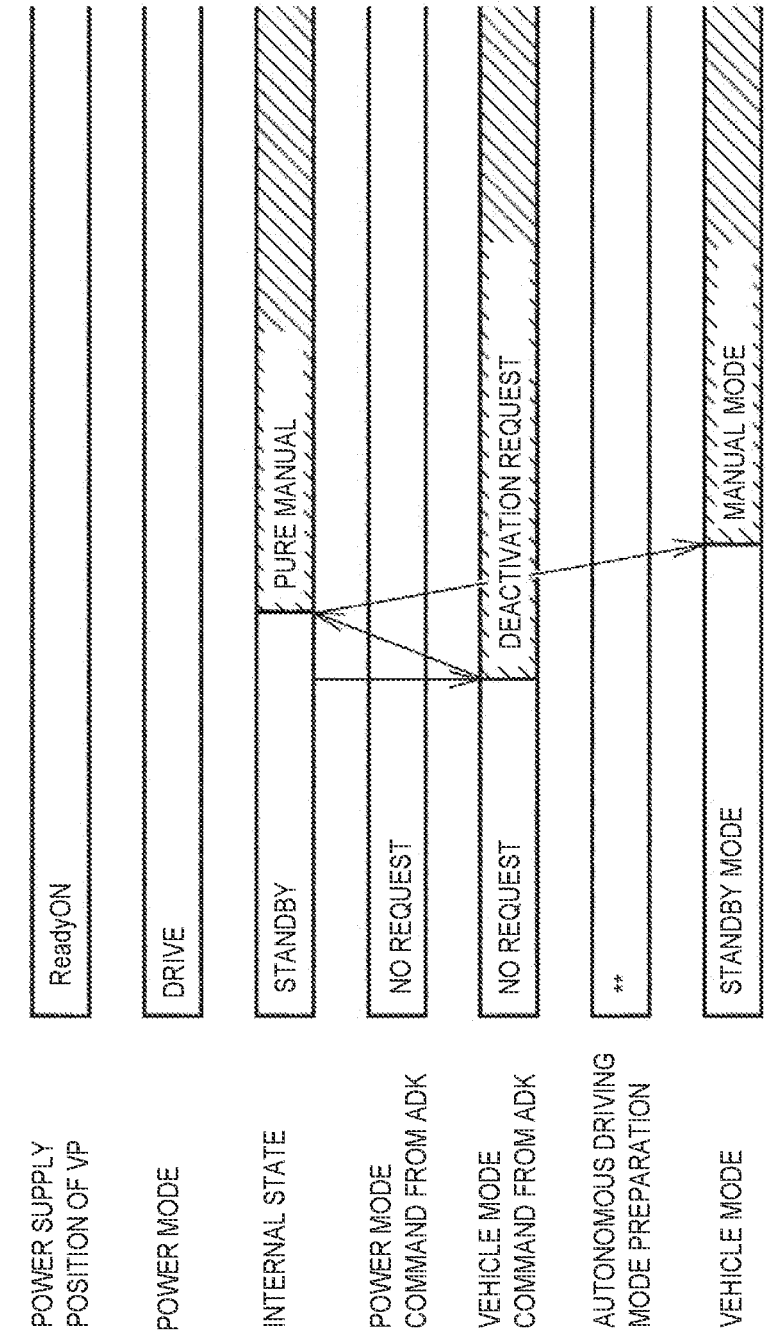

VEHICLE CONTROL INTERFACE, VEHICLE, AND CONTROL METHOD FOR VEHICLE

CROSS-REFERENCE TO RELATED APPLICATION

This application claims priority to Japanese Patent Application No. 2022-066930 filed on Apr. 14, 2022, incorporated herein by reference in its entirety.

BACKGROUND

1. Technical Field

The present disclosure relates to a vehicle control interface, a vehicle, and a control method for a vehicle.

2. Description of Related Art

Recent years have seen progress in the development of autonomous driving technology for vehicles. For example, in a vehicle control system disclosed in Japanese Unexamined Patent Application Publication No. 2019-177807 (JP 2019-177807 A), a vehicle and an information processing device cooperate to execute autonomous driving. The information processing device automatically generates control information using autonomous driving control software, and transmits the control information to the vehicle. The vehicle performs autonomous driving based on the received control information.

SUMMARY

It is conceivable to externally attach an autonomous driving system to a vehicle body (vehicle platform, which will be described below). Autonomous driving is achieved by the vehicle platform controlling the vehicle according to commands from the autonomous driving system.

In order to appropriately coordinate the autonomous driving system and the vehicle platform, it is desirable to provide an appropriate interface between the autonomous driving system and the vehicle platform. The importance of such an interface can be particularly pronounced, for example, when the developer of the autonomous driving system and the developer of the vehicle platform are different from each other.

Generally, in a vehicle of the related art that is not equipped with an autonomous driving system, the vehicle platform is activated in response to a command corresponding to a manual operation (typically, a turning-on operation of a power switch) on the vehicle body. In addition to the above, in a vehicle equipped with an autonomous driving system, a vehicle platform may be activated in response to a command transmitted from the autonomous driving system to the vehicle platform via the interface.

In many electrical devices, including vehicles, there is always a demand for high robustness. JP 2019-177807 A does not particularly discuss the fact that there are two ways of activating a vehicle body as described above in a vehicle equipped with an autonomous driving system. Therefore, the disclosure described in JP 2019-177807 A has room for improvement in terms of improving the robustness of a vehicle.

The present disclosure provides a vehicle control interface, a vehicle, and a vehicle control method for improving the robustness of a vehicle that can be equipped with an autonomous driving system.

A vehicle control interface according to a first aspect of the present disclosure is connected between an autonomous driving system and a vehicle platform that is configured to perform autonomous driving according to a command from the autonomous driving system. The vehicle control interface includes a memory in which a program including a predetermined application programming interface (API) defined for each of signals is stored, and a processor configured to perform interfacing between the autonomous driving system and the vehicle platform by executing the program. The vehicle platform is configured to be activated in response to one of a first activation command and a second activation command. The first activation command is a command transmitted from the autonomous driving system to the vehicle platform via the vehicle control interface. The second activation command is a command in response to a manual operation on the vehicle platform. The processor is configured to, when the vehicle platform is activated in response to the first activation command, reduce the effectiveness of the manual operation on the vehicle platform compared to when the vehicle platform is activated in response to the second activation command.

In the first aspect, when the vehicle platform is activated in response to the first activation command, the processor may restrict the manual operation received by the vehicle platform compared to when the vehicle platform is activated in response to the second activation command.

In the first aspect, when the vehicle platform is activated in response to the first activation command, the processor may be configured to transition from a manual driving mode to an autonomous driving mode by going through a standby mode in which the manual operation received by the vehicle platform is restricted.

In the first aspect, the processor may be configured to transition from the manual driving mode to the autonomous driving mode in response to an autonomous driving transition command from the autonomous driving system when the vehicle platform is activated in response to the second activation command. When the vehicle platform is activated in response to the first activation command, the processor may be configured to transition from the manual driving mode to the standby mode after executing an initial diagnosis of the vehicle platform, maintain the standby mode until receiving the autonomous driving transition command, and transition from the standby mode to the autonomous driving mode when the autonomous driving transition command is received. The standby mode may be a mode in which the vehicle platform renders traveling impossible.

In the first aspect, the processor may be configured to transition from the manual driving mode to the standby mode when a vehicle speed is zero and a shift position is a parking position.

In the first aspect, the standby mode may be a mode that includes processing which disables a manual shift operation on the vehicle platform.

In the first aspect, the standby mode may be a mode that includes processing which disables a manual accelerator operation on the vehicle platform.

In the first aspect, the standby mode may be a mode that includes processing which disables a manual parking brake release operation on the vehicle platform.

In the first aspect, the vehicle platform may include an air conditioner or an audio system. The standby mode may be a mode that includes processing which disables the manual operation on the air conditioner or the audio system.

In the configuration described above, when the vehicle platform is activated in response to the first activation command, the effectiveness of the manual operation on the vehicle platform is set to be low compared to when the vehicle platform is activated in response to the second activation command. This prevents the vehicle from being used in a manner not intended by the vehicle administrator. For example, by disabling a shift operation, an accelerator operation, a parking brake release operation, and the like, it is possible to prevent the vehicle from traveling due to an undesirable operation by a user. Alternatively, by disabling the operation of the air conditioner or the audio system, it is possible to prevent the setting change of the vehicle cabin environment due to the undesirable operation by the user. Therefore, the robustness of the vehicle can be improved.

A vehicle according to a second aspect of the present disclosure is configured to be equipped with an autonomous driving system. The vehicle includes a vehicle platform configured to perform autonomous driving according to a command from the autonomous driving system, and a vehicle control interface configured to perform interfacing between the autonomous driving system and the vehicle platform by executing a predetermined API defined for each of signals. The vehicle platform is configured to be activated in response to one of a first activation command and a second activation command. The first activation command is a command transmitted from the autonomous driving system to the vehicle platform via the vehicle control interface. The second activation command is a command in response to a manual operation on the vehicle platform. The vehicle control interface is configured to, when the vehicle platform is activated in response to the first activation command, reduce the effectiveness of the manual operation on the vehicle platform as compared to when the vehicle platform is activated in response to the second activation command.

A third aspect of the present disclosure is a control method for a vehicle configured to be equipped with an autonomous driving system. The vehicle includes a vehicle platform configured to perform autonomous driving according to a command from the autonomous driving system, and a vehicle control interface configured to perform interfacing between the autonomous driving system and the vehicle platform by executing a predetermined API defined for each of signals. The control method includes activating the vehicle platform in response to one of a first activation command and a second activation command, and reducing the effectiveness of a manual operation on the vehicle platform when the vehicle platform is activated in response to the first activation command as compared to when the vehicle platform is activated in response to the second activation command. The first activation command is a command transmitted from the autonomous driving system to the vehicle platform via the vehicle control interface. The second activation command is a command in response to the manual operation on the vehicle platform.

With the vehicle or the control method, similar to the vehicle control interface, it is possible to improve the robustness of the vehicle.

With each aspect of the present disclosure, it is possible to improve the robustness of a vehicle configured to be equipped with an autonomous driving system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a state transition diagram for illustrating vehicle modes in a comparative example;

FIG. 5 is a state transition diagram for illustrating vehicle modes in the embodiment;

FIG. 6 is a time chart for illustrating the transition from an unknown state of a manual driving mode to a pre-standby state;

FIG. 7 is a time chart for illustrating the transition from the pre-standby state of the manual driving mode to a standby mode;

FIG. 8 is a time chart for illustrating the transition from the standby mode to an autonomous driving mode; and FIG. 9 is a time chart for illustrating the transition from the standby mode to a pure manual state of the manual driving mode.

DETAILED DESCRIPTION OF EMBODIMENTS

Figure 1:
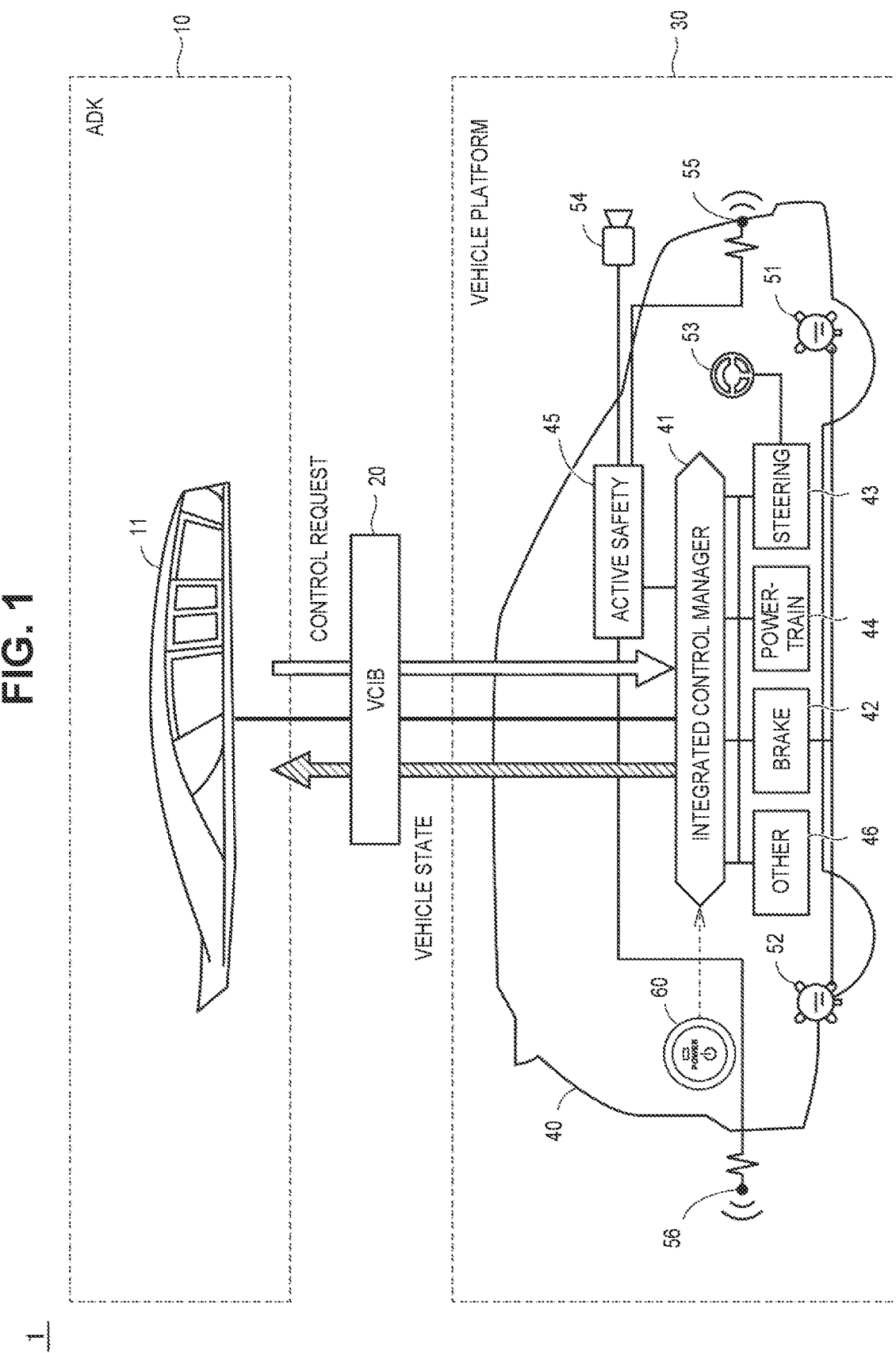
FIG. 1 is a diagram illustrating an outline of a vehicle according to an embodiment of the present disclosure.

Hereinafter, an embodiment of the present disclosure will be described in detail with reference to the drawings. The same or corresponding parts in the drawings are denoted by the same reference numerals, and the description thereof will not be repeated.

Embodiment

Vehicle Configuration

FIG. 1 is a diagram illustrating an outline of a vehicle according to the embodiment of the present disclosure. A vehicle 1 is configured to be capable of highly autonomous driving (for example, autonomous driving classified as so-called autonomous driving level 4 or 5) in which a driving subject is a system. In this example, in order to facilitate understanding, it is assumed that the vehicle 1 is used for autonomous driving-related mobility services such as ride sharing and car sharing.

The vehicle 1 includes an autonomous driving kit (ADK) 10, a vehicle control interface (Vehicle Control Interface Box: VCIB) 20, and a vehicle platform (VP) 30. The ADK 10 can be attached to or removed from the VP 30 (such as the rooftop of the VP 30). The ADK 10 and the VP 30 are connected so as to be able to communicate with each other via a vehicle control interface 20 according to a communication standard such as a controller area network (CAN).

The ADK 10 includes an autonomous driving system (ADS) 11 for automatically driving the vehicle 1. The ADK 10 (ADS 11) creates a travel plan for the vehicle 1. The ADK 10 outputs various commands (control requests) for causing the vehicle 1 to travel according to the travel plan, to the VP 30, in accordance with an application program interface (API) defined for each control request. Further, the ADK 10 receives various signals indicating the vehicle state (the state of the VP 30) from the VP 30 according to the API defined for each of a plurality of signals. The ADK 10 then reflects the vehicle state in the travel plan. A detailed configuration of the ADK 10 will be described further below with reference to FIG. 2.

The VCIB 20 receives various control requests from the ADK 10 and outputs the vehicle state to the ADK 10 by executing a predetermined API defined for each of a plurality of signals. When receiving a control request from the ADK 10, the VCIB 20 outputs a control command corresponding to the control request to a system corresponding to the control command via an integrated control manager 41. Further, the VCIB 20 acquires various kinds of information of the VP 30 from various systems via the integrated control manager 41 and outputs the various kinds of information of the VP 30 to the ADK 10 as the vehicle state.

When the ADK 10 is attached, the VP 30 can execute autonomous driving control in an autonomous driving mode according to control requests from the ADK 10. Further, when the ADK 10 is removed, the VP 30 executes travel control (travel control according to a user's operation) in a manual driving mode.

The VP 30 includes a base vehicle 40. The base vehicle 40 executes various vehicle controls according to control requests from the ADK 10. The base vehicle 40 includes, for example, the integrated control manager 41, a brake system 42, a steering system 43, a powertrain system 44, an active safety system 45, other systems 46 (see FIG. 2), wheel speed sensors 51, 52, a pinion angle sensor 53, a camera 54, radar sensors 55, 56, and a power switch 60.

The integrated control manager 41 includes a processor and a memory (both not illustrated), and integrates and controls each of the systems (brake system 42, steering system 43, powertrain system 44, active safety system 45, other system 46) involved in the operation of the vehicle 1.

The brake system 42 controls a braking device provided for each wheel of the base vehicle 40. The braking device includes, for example, a disc brake system (not illustrated) that operates in response to hydraulic pressure regulated by an actuator.

The wheel speed sensors 51, 52 are connected to the brake system 42. The wheel speed sensor 51 detects the rotational speed of the front wheels of the base vehicle 40 and outputs the detected rotational speed of the front wheels to the brake system 42. The wheel speed sensor 52 detects the rotational speed of the rear wheels of the base vehicle 40 and outputs the detected rotational speed of the rear wheels to the brake system 42. The brake system 42 outputs the rotational speed of each wheel to the VCIB 20 as one of the kinds of information included in the vehicle state. The integrated control manager 41 calculates the speed (vehicle speed) of the vehicle 1 based on the rotational speed of each wheel. Also, the brake system 42 generates a braking command for the braking device according to a predetermined control request outputted from the ADK 10 via the VCIB 20 and the integrated control manager 41. The brake system 42 controls the braking device using the generated braking commands.

The steering system 43 controls the steering angle of the steered wheels of the vehicle 1 using a steering device. The steering device includes, for example, rack-and-pinion electric power steering (EPS) of which the steering angle can be adjusted by an actuator.

The pinion angle sensor 53 is connected to the steering system 43. The pinion angle sensor 53 detects the rotation angle (pinion angle) of a pinion gear connected to a rotary shaft of the actuator and outputs the detected pinion angle to the steering system 43. The steering system 43 outputs the pinion angle to the VCIB 20 as one of the kinds of information included in the vehicle state. Further, the steering system 43 generates a steering command for the steering device according to a predetermined control request outputted from the ADK 10 via the VCIB 20 and the integrated control manager 41. The steering system 43 controls the steering device using the generated steering commands.

The powertrain system 44 controls an electric parking brake (EPB) system 441 provided on at least one of a plurality of wheels, a parking lock (P-Lock) system 442 provided on the transmission of the vehicle 1, and a propulsion system 443 including a shift device (not illustrated) configured to select a shift position. A more detailed configuration of the powertrain system 44 will be described further below with reference to FIG. 2.

The active safety system 45 uses the camera 54 and/or the radar sensors 55, 56 to detect forward or rearward obstacles (pedestrians, bicycles, parked vehicles, utility poles, and the like). The active safety system 45 determines whether the vehicle 1 may collide with an obstacle based on a distance between the vehicle 1 and the obstacle and a movement direction of the vehicle 1. When the active safety system 45 determines that there is a possibility of collision, it outputs a braking command to the brake system 42 via the integrated control manager 41 so as to increase the braking force.

The power switch 60 accepts an operation of a user (for example, a person in charge of a mobility service provider) who selects the power supply position of the vehicle 1. The power supply positions include an ignition off (IG-OFF) position, an accessory (ACC) position, an ignition on (IG-ON) position, an activation position, and a ReadyON position.

The IG-OFF position corresponds to a power-off state of the vehicle 1. In the IG-OFF position, the power supply to each device mounted on the vehicle 1 is cut off. In the ACC position, power is supplied to accessory devices such as air conditioners and audio equipment. In the IG-ON position, power is supplied to the accessory devices as well as systems necessary for the vehicle 1 to travel. When the activation position is selected, the VP 30 is activated to make the vehicle 1 ready to travel. After the activation of the VP 30, an initial diagnosis (initial check) of the VP 30 is executed. The initial diagnosis is a diagnosis for confirming that each system (brake system 421, steering system 431, EPB system 441, P-Lock system 442, propulsion system 443, and the like) in the VP 30 is normal. As a result of the initial diagnosis, when it is confirmed that the VP 30 is normal, the position transitions from the activation position to the ReadyON position.

Detailed Configuration

Figure 2:
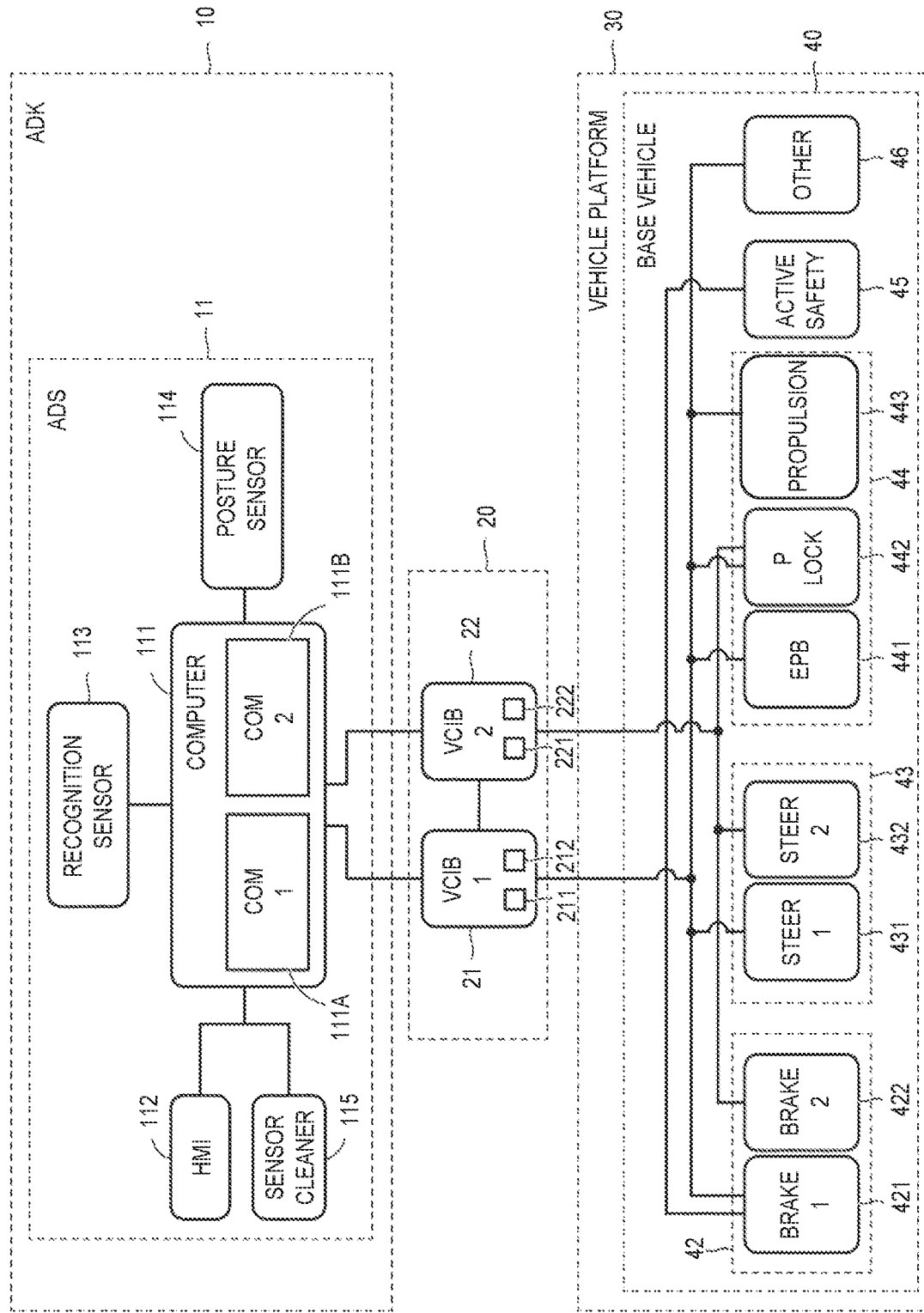
FIG. 2 is a diagram illustrating a configuration of an autonomous driving kit, a vehicle control interface, and a vehicle platform in more detail.

FIG. 2 is a diagram illustrating the configuration of the ADK 10, the VCIB 20, and the VP 30 in more detail. As illustrated in FIG. 2, the ADK 10 (ADS 11) includes a computer 111, a human machine interface (HMI) 112, a recognition sensor 113, a posture sensor 114, and a sensor cleaner 115.

The computer 111 acquires the environment of the vehicle 1 and the posture, behavior, and position of the vehicle 1 using various sensors (described below) during autonomous driving of the vehicle 1. Further, the computer acquires the vehicle state from the VP 30 via the VCIB 20 and sets the next operation (acceleration, deceleration, turning, and the like) of the vehicle 1. The computer 111 then outputs various commands to the VCIB 20 for realizing the following operations. The computer 111 includes communication modules 111A, 111B.

The HMI 112 is connected to an input/output device (not illustrated) such as a touch panel display provided on the base vehicle 40, for example. The HMI 112 presents information to a user and accepts user operations during autonomous driving, driving that requires user operations, transition between the autonomous driving and the driving that requires user operations, and the like.

The recognition sensor 113 is a sensor for recognizing the environment of the vehicle 1. The recognition sensor 113 includes, for example, at least one of a laser imaging detection and ranging (LiDAR), a millimeter wave radar, and a camera (none of which is illustrated). The LiDAR emits, for example, infrared pulsed laser light rays, and measures the distance and direction of a target object by detecting a reflected light ray of the laser light rays from the target object. The millimeter wave radar measures the distance and direction of a target object by emitting millimeter waves and detecting a reflected wave of the millimeter waves from the target object. The camera is placed behind a rear-view mirror, for example, and captures an image in front of the vehicle 1.

The posture sensor 114 is a sensor for detecting the posture, behavior, and position of the vehicle 1. The posture sensor 114 includes, for example, an inertial measurement unit (IMU) and a global positioning system (GPS) (both not illustrated). The IMU detects, for example, the longitudinal, lateral, and vertical accelerations of the vehicle 1 and the angular velocities of the vehicle 1 in the roll, pitch, and yaw directions. The GPS detects the position of the vehicle 1 using information received from a plurality of GPS satellites orbiting the earth.

The sensor cleaner 115 is configured to remove dirt adhering to the various sensors (camera lens, laser beam irradiation portion, and the like) while the vehicle 1 is traveling using a cleaning liquid, a wiper, or the like.

The VCIB 20 includes a VCIB 21 and a VCIB 22. The VCIB 21 includes a processor 211 and a memory 212. The VCIB 22 includes a processor 221 and a memory 222. Each of the memories 212, 222 includes a read-only memory (ROM), a random access memory (RAM), or the like, and stores a program including a predetermined API defined for each of a plurality of signals. Each of the processors 211, 221 includes a central processing unit (CPU), or the like, and performs interfacing between the ADK 10 and the VP 30 by executing the program.

The VCIB 21 and the communication module 111A are connected so as to be able to communicate with each other. The VCIB 22 and the communication module 111B are connected so as to be able to communicate with each other. Furthermore, the VCIB 21 and the VCIB 22 are connected so as to be able to communicate with each other.

Each of the VCIBs 21, 22 relays control requests and vehicle information between the ADK 10 and the VP 30. More specifically, the VCIB 21 uses APIs to generate control commands from the control requests sent from the ADK 10. A control command corresponding to the control request supplied from the ADK 10 to the VCIB 20 includes, for example, a propulsion direction command requesting switching of the shift position, an immobility command requesting activation/deactivation of the EPB system 441 and the P-Lock system 442, an acceleration command requesting acceleration or deceleration of the vehicle 1, a tire steering angle command requesting a tire steering angle of the steered wheel, and an autonomization command requesting switching between the autonomous driving mode and the manual driving mode. The VCIB 21 then outputs the generated control command to the corresponding system among a plurality of systems included in the VP 30. Also, the VCIB 21 generates information indicating the vehicle state from the vehicle information from each system of the VP 30 using APIs. The information indicating the vehicle state may be the same information as the vehicle information, or may be information extracted from the vehicle information to be used in the processing executed by the ADK 10. The VCIB 21 outputs the generated information indicating the vehicle state to the ADK 10. The same applies for the VCIB 22.

The brake system 42 includes brake systems 421, 422. The steering system 43 includes steering systems 431, 432. The powertrain system 44 includes the EPB system 441, the P-Lock system 442, and the propulsion system 443.

The VCIB 21 and the VCIB 22 fundamentally have the same functions, but the VCIB 21 and the VCIB 22 partially differ in connection destinations to the systems included in the VP 30. Specifically, the VCIB 21, the brake system 421, the steering system 431, the EPB system 441, the P-Lock system 442, the propulsion system 443, and the other system 46 are communicably connected to each other via a communication bus. The VCIB 22, the brake system 422, the steering system 432, and the P-Lock system 442 are communicably connected to each other via a communication bus.

In this way, the control system between the ADK 10 and the VP 30 is made redundant by the VCIBs 21, 22 having equivalent functions with respect to some system operations (braking, steering, and the like). Therefore, when a problem occurs in the system, the functions of the VP 30 can be maintained by appropriately switching the control system or disconnecting the control system in which the problem has occurred.

Each of the brake systems 421, 422 is configured to be able to control the braking device. The brake system 421 generates a braking command for the braking device according to a control request outputted from the ADK 10 via the VCIB 21. The brake system 422 generates a braking command for the braking device according to a control request outputted from the ADK 10 via the VCIB 22. The brake system 421 and the brake system 422 may have equivalent functions. Alternatively, one of the brake systems 421, 422 may be configured to be able to independently control the braking force of each wheel, and the other may be configured to cause the same braking force to be generated at each wheel. The brake systems 421, 422, for example, may control the braking device using a braking command generated by one of the brake systems, and when an abnormality occurs in the brake system, the braking device may be controlled using a braking command generated by the other brake system.

Each of the steering systems 431, 432 is configured to be able to control the steering angle of the steered wheels of the vehicle 1 using the steering device. The steering system 431 generates a steering command for the steering device according to the control request outputted from the ADK 10 via the VCIB 21. The steering system 432 generates a steering command for the steering device according to the control request outputted from the ADK 10 via the VCIB 22. The steering system 431 and the steering system 432 may have equivalent functions. Alternatively, the steering systems 431, 432, for example, may control the steering device using a steering command generated by one of the steering systems, and when an abnormality occurs in the steering system, the steering device may be controlled using a steering command generated by the other steering system.

The EPB system 441 controls the EPB according to control requests outputted from the ADK 10 via the VCIB 21. The EPB is provided separately from the braking device (such as a disc brake system) and locks the wheels by the operation of an actuator. The EPB, for example, uses an actuator to operate a drum brake for parking brakes provided on some of a plurality of wheels in order to lock the wheel, or the EPB uses an actuator capable of adjusting the hydraulic pressure supplied to the braking device separately from the brake systems 421, 422 to operate the braking device and lock the wheel.

The P-Lock system 442 controls a P-Lock device according to control requests outputted from the ADK 10 via the VCIB 21. The P-Lock system 442 operates the P-Lock device, for example, when the control request includes a control request to shift the shift position to the parking position (P range), and the P-Lock system 442 does not operate the P-Lock device when the control request includes a control request to shift the shift position to a position other than the parking position. The P-Lock device engages a protrusion portion at a tip end of a parking lock pole of which the position can be adjusted by an actuator into teeth of a gear (lock gear) connected to a rotating element in the transmission of the vehicle 1. Thereby, the rotation of an output shaft of the transmission is locked, and the wheels are locked.

The propulsion system 443 switches the shift position of a shift device (not illustrated) and controls the driving force from a drive source (motor generator, engine, and the like) according to a control request outputted from the ADK 10 via the VCIB 21. The shift positions include, for example, a neutral position (N range), a forward travel position (D range), and a reverse travel position (R range) in addition to the parking position.

The active safety system 45 is communicably connected to the brake system 421. As described above, the active safety system 45 uses the camera 54 and/or the radar sensor 55 to detect obstacles ahead, and when it determined that there is a possibility of collision, the active safety system 45 outputs a braking command to the brake system 421 so as to increase the braking force.

The other system 46 includes a body system, an air conditioner, an audio system (none of which are illustrated), and the like. The body system controls components such as direction signals, horns, and wipers according to control requests from the ADK 10. The air conditioner air-conditions the cabin of the vehicle according to control requests from the ADK 10 or operations of a user. The audio system plays music and/or video in the vehicle cabin according to control requests from the ADK 10 or operations of a user.

In the vehicle 1, autonomous driving is executed when the autonomous driving mode is selected by the user's operation on the HMI 112, for example. As described above, the ADK 10 first creates a travel plan during autonomous driving. Examples of the travel plan include a plan to continue going straight, a plan to turn left/right at a predetermined intersection in the middle of a predetermined travel route, and a plan to change lanes. The ADK 10 calculates control-related physical quantities (acceleration, deceleration, tire steering angle, and the like) necessary for the vehicle 1 to operate according to the created travel plan. The ADK 10 divides the physical quantity for each execution cycle of the API. The ADK 10 uses the API to output a control request representing the divided physical quantity to the VCIB 20. Further, the ADK 10 acquires the vehicle state (actual moving direction of vehicle 1, vehicle locking state, and the like) from the VP 30, and recreates the travel plan reflecting the acquired vehicle state. In this way, the ADK 10 enables the vehicle 1 to drive autonomously.

Power Mode

Figure 3:
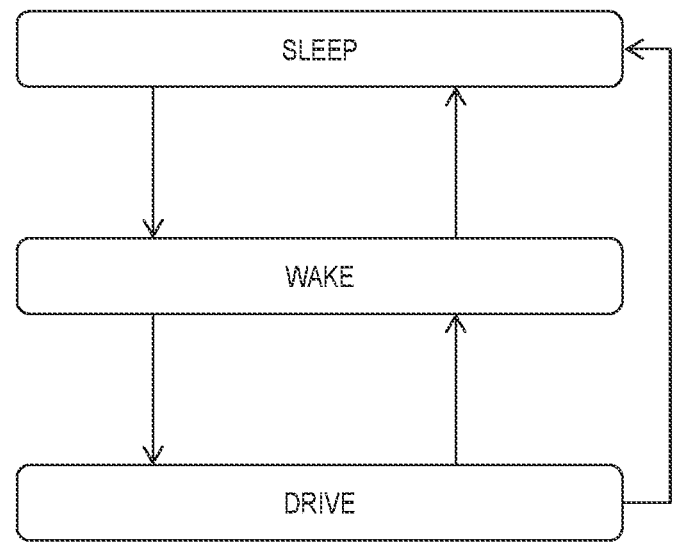
FIG. 3 is a state transition diagram for a power mode of the vehicle platform.

FIG. 3 is a state transition diagram for the power mode of the VP 30. The power mode of the VP 30 includes a sleep mode, a wake mode, and a drive mode.

The sleep mode is a mode corresponding to the power-off state. In the sleep mode, electric power is not supplied to each system from a high-voltage battery (not illustrated) for traveling. Also, the VCIB 20 is not activated, and an electronic control unit (ECU) such as the integrated control manager 41 is not activated.

The wake mode is a mode in which the VCIB 20 is activated by electric power supply from an auxiliary battery (not illustrated) provided in the VP 30. In the wake mode, ECUs such as the integrated control manager 41 are not activated except for some body ECUs.

The drive mode is a mode corresponding to the ReadyON state. In the drive mode, electric power is supplied to each system from the high-voltage battery. Further, the VCIB 20 is activated and all the ECUs are activated.

The sleep mode and the wake mode can bi-directionally transition. Also, both the wake mode and the drive mode can bi-directionally transition. However, the sleep mode can only transition to the drive mode via the wake mode. On the other hand, the drive mode can directly transition to the sleep mode without going through the wake mode.

Achieving both Convenience and Robustness

In the vehicle 1 configured as described above, there are two ways of activating the VP 30. A first activation method is activating the VP 30 in response to a ReadyON command (first activation command according to the present disclosure) transmitted from the ADK 10 to the VP 30 via the VCIB 20. A second activation method is activating the VP 30 in response to a ReadyON command (second activation command according to the present disclosure) in response to a manual operation for the VP30 (specifically, a turning-on operation of the power switch 60).

As with many electrical devices, there is a desire to improve the robustness of the vehicle 1. Therefore, in the present embodiment, a configuration is adopted in which the VCIB 20 switches modes in correspondence with the two activation methods. The modes are referred to as "vehicle modes". In order to facilitate understanding of the features of the present embodiment, the switching of the vehicle modes will first be described in detail with reference to a comparative example.

Vehicle Mode

FIG. 4 is a state transition diagram for illustrating the vehicle modes in a comparative example. The VCIB has a manual driving mode and an autonomous driving mode as the vehicle modes (indicated by thin broken lines). The manual driving mode includes an unknown state and a manual state as internal states thereof (indicated by thick solid lines).

The wake mode is assumed as the initial state of the vehicle. The VCIB is in the unknown state of the manual driving mode. The shift position of the shift device of the propulsion system is the parking position. The EPB of the EPB system is operating.

In the unknown state, when the ReadyON command is generated from the ADK 10 or the ReadyON command is generated by a user's manual operation, the state of the VCIB transition from the unknown state to the manual state. In the manual state, the integrated control manager 41 (which could be another ECU) executes an initial diagnosis.

When receiving an autonomous driving transition command from the ADK 10 in the manual state after executing the initial diagnosis, the mode of the VCIB transition from the manual driving mode (manual state) to the autonomous driving mode (autonomous state). In the autonomous driving mode, the integrated control manager 41 controls the VP 30 according to a request from the ADK 10 to realize autonomous driving.

Here, the initial diagnosis in the manual driving mode (manual state) may take some time. In addition, due to failures or intentional choice, the ADK 10 may not output the autonomous driving transition command for a certain period of time. In such a case, in the comparative example, the manual driving mode is maintained without a transition from the manual driving mode to the autonomous driving mode. The vehicle in the meantime is in a travelable state. Therefore, the vehicle may be used in a manner not intended by the vehicle administrator. For example, due to undesirable operations by users (occupants) who receive autonomous driving-related mobility services such as ride sharing and car sharing, there is a possibility that the vehicle will travel or the vehicle settings are changed in a manner not intended by the mobility service provider.

FIG. 5 is a state transition diagram for illustrating vehicle modes in the embodiment. The VCIB 20 has a standby mode in addition to a manual driving mode and an autonomous driving mode. Further, the manual driving mode includes an unknown state, a pure manual state, and a pre-standby state.

When receiving a ReadyON command by a user's manual operation in the unknown state, the state of the VCIB 20 transitions from the unknown state to the pure manual state (see E1). In the pure manual state, the integrated control manager 41 (or other ECU) executes an initial diagnosis.

When receiving an autonomous driving transition command from the ADK 10 in the pure manual state after executing the initial diagnosis, the mode of the VCIB 20 transitions from the manual driving mode (pure manual state) to the autonomous driving mode (autonomous state) (see E3). In the autonomous driving mode, as in the comparative example, the integrated control manager 41 controls the VP 30 according to a request from the ADK 10 to realize autonomous driving.

When receiving an autonomous driving stop command from the ADK 10 in the autonomous driving mode, the mode of the VCIB 20 transitions from the autonomous driving mode (autonomous state) to the manual driving mode (pure manual state) (see E6).

On the other hand, when receiving a ReadyON command from the ADK 10 in the unknown state, the state of the VCIB 20 transitions from the unknown state to the pre-standby state (see E2). Even in the pre-standby state, the integrated control manager 41 (or other ECU) executes an initial diagnosis. Then, the mode of the VCIB 20 transitions further from the manual driving mode (pre-standby state) to the standby mode (standby state) (see E4).

In the standby mode, manual operations accepted by the VP 30 are restricted. More specifically, the integrated control manager 41 (which may be an ECU in the propulsion system 443) will not accept a shift operation (shift position switching operation) for a shift device (not illustrated) of the propulsion system 443. Further, the integrated control manager 41 will not accept an accelerator operation (accelerator pedal depression operation). In addition, the integrated control manager 41 (which may be an ECU in the EPB system 441) will not accept an EPB release operation of the EPB system 441. In other words, the shift operation, the accelerator operation, and the EPB release operation are disabled in the standby mode. This means that the effectiveness of the manual operation is set to be low in the standby mode with respect to enabling/disabling of the manual operation.

In the standby mode, instead of or in addition to the three manual operations, operations related to the air conditioner and/or the audio system in the other system 46 may be disabled. For example, switching on/off of the air conditioner, changing the target temperature, changing the air volume, and the like may be prohibited. It may also be prohibited to change the music and/or video being played in the audio system, change the volume, and the like.

When receiving an autonomous driving transition command from the ADK 10 in the standby mode, the mode of the VCIB 20 transitions from the standby mode (standby state) to the autonomous driving mode (autonomous state) (see E5). In the autonomous driving mode, autonomous driving is realized as described above.

When receiving a standby mode stop command from the ADK 10 in the autonomous driving mode, the mode of the VCIB 20 transitions from the standby mode (standby state) to the manual driving mode (pure manual state) (see E8).

When an IG-OFF operation (typically, a turn-off operation of the power switch 60) is performed in the pure manual state, the state of the VCIB 20 transitions from the pure manual state to the unknown state (see E7). Similarly, when an IG-OFF operation is performed in the pre-standby state, the state of the VCIB 20 transitions from the pre-standby state to the unknown state (see E10).

Thus, in the embodiment, in a case where the VP 30 is activated in response to the ReadyON command from the ADK 20, the VCIB 20 passes through the standby mode when the vehicle mode transitions from the manual driving mode to the autonomous driving mode. That is, when the VP 30 is activated in response to the ReadyON command from the ADK 20, the VCIB 20 causes the vehicle mode to transition from the manual driving mode to the autonomous driving mode via the standby mode. In the standby mode, the shift operation, the accelerator operation, and the EPB release operation are disabled, so the user (occupants of the mobility service, or the like) cannot manually drive the vehicle 1. In addition, since the air conditioning operation or the audio operation is also disabled, the user cannot arbitrarily change the environment inside the vehicle. Therefore, improper actions by a malicious user can be prevented. Therefore, according to the embodiment, the robustness of the vehicle 1 can be improved.

It is described that the shift operation, the accelerator operation, and the EPB release operation are all disabled in the standby mode. However, only one or two of the three operations may be disabled. For example, only the shift operation and the accelerator operation may be disabled. However, by disabling all three operations, it is possible to more reliably create a state in which the vehicle 1 cannot travel.

Transition Details

Hereinafter, among the transitions between the vehicle modes illustrated in FIG. 5, transitions related to the pre-standby state of the manual operation mode and transitions related to the standby mode (standby state) will be described in more detail. Specifically, transitions denoted by reference numerals and letters E2, E4, E5, and E6 will be described.

FIG. 6 is a time chart for illustrating the transition (see E2) from the unknown state of the manual driving mode to the pre-standby state. FIG. 6 illustrates, in order from top to bottom, a power supply position (internal_VP_Power_Mode_Status) of the VP 30, a power mode (PowerModeStatus) of the VCIB 20, an internal state (internal_VP_Vehicle_Mode_State), a power mode command (PowerModeCommand) from the ADK 10, vehicle power supply processing in the VCIB 20, ReadyON processing in the VP 30 (vehicle 1), and a vehicle mode (VehicleModeState).

In the unknown state of the manual driving mode, the ADK 10 outputs a transition command to the drive mode of the power mode. Then, the internal state transitions from the unknown state to the pre-standby state. Further, the vehicle power supply processing is executed in the VCIB 20 and the ReadyON processing is executed in the VP 30. As a result, the power supply position of the VP 30 transitions to the ReadyON position. Further, the power mode of the VCIB 20 transitions from the wake mode to the drive mode.

FIG. 7 is a time chart for illustrating the transition (see E4) from the pre-standby state of the manual driving mode to the standby mode. In addition to the items illustrated in FIG. 6, FIG. 7 further illustrates a vehicle mode command (Power-ModeCommand) from the ADK 10, standby mode preparation (ReadinessForStandbyMode), autonomous driving mode preparation (ReadinessForAutonomization), a vehicle speed (SP1), and a shift position (SFTP_FS).

In the pre-standby state of the manual driving mode, when the initial diagnosis ends, the internal state transitions from the pre-standby state to the standby state on the condition that the standby mode preparation is completed (specifically, vehicle speed=0 and shift position=parking position). In addition thereto, the vehicle mode also transitions from the manual driving mode to the standby mode.

FIG. 8 is a time chart for illustrating the transition (see E5) from the standby mode to the autonomous driving mode. In the standby mode, the ADK 10 outputs a transition command to the autonomous driving mode of the vehicle mode. Then, the internal state transitions from the standby state to the autonomous state on the condition that the autonomous driving mode preparation is completed (specifically, the initial diagnosis indicates that autonomous driving is possible). Furthermore, the vehicle mode transitions from the standby mode to the autonomous driving mode.

FIG. 9 is a time chart for illustrating the transition (see E8) from the standby mode to the pure manual state of the manual driving mode. In the standby mode, a deactivation request (DeactivationRequest) is generated as a vehicle mode command from the ADK 10. In addition thereto, the internal state transitions from the standby state to the pure manual state. Furthermore, the vehicle mode transitions from the standby mode to the manual driving mode.

As described above, in the embodiment, the standby mode is provided between the manual driving mode and the autonomous driving mode. In the standby mode, the effectiveness of the manual operation on the VP 30 is set to be low. This prevents the vehicle 1 from being used in a manner not intended by an administrator of the vehicle 1. To give a specific example, the user operations (shift operation, accelerator operation, and EPB release operation) for driving the vehicle 1 (VP 30) are disabled, thereby preventing the vehicle 1 from traveling due to undesirable user operations. In addition, since the operation of the air conditioner or the audio system is disabled, it is possible to prevent the setting of the vehicle 1 from being changed due to undesirable user operations. Therefore, according to the embodiment, the robustness of the vehicle 1 can be improved.

The embodiment disclosed at present should be considered to be illustrative in all respects and not restrictive. The scope of the present disclosure is indicated by the scope of the claims rather than the description of the embodiment, and is intended to include all modifications within the scope and meaning equivalent to the scope of the claims.

What is claimed is:

1. A vehicle control interface that is connected between an autonomous driving system and a vehicle platform configured to perform autonomous driving according to a command from the autonomous driving system, the vehicle control interface comprising:

a memory in which a program including a predetermined application programming interface (API) defined for each of a plurality of signals is stored; and a processor configured to perform interfacing between the autonomous driving system and the vehicle platform by executing the program, wherein:

the vehicle platform is configured to be activated in response to one of a first activation command and a second activation command;

the first activation command is a command transmitted from the autonomous driving system to the vehicle platform via the vehicle control interface;

the second activation command is a command in response to a manual operation on the vehicle platform; and the processor is configured to:

when the vehicle platform is activated in response to the first activation command, transition from a manual driving mode to an autonomous driving mode by going through a standby mode in which the manual operation received by the vehicle platform is restricted;

when the vehicle platform is activated in response to the second activation command, transition from the manual driving mode to the autonomous driving mode in response to an autonomous driving transition command from the autonomous driving system; and when the vehicle platform is activated in response to the first activation command, transition from the manual driving mode to the standby mode after executing an initial diagnosis of the vehicle platform, maintain the standby mode until having received the autonomous driving transition command, and transition from the standby mode to the autonomous driving mode in response to receiving the autonomous driving transition command; and the standby mode is a mode in which the vehicle platform renders traveling impossible.

2. The vehicle control interface according to claim 1, wherein the processor is configured to transition from the manual driving mode to the standby mode when a vehicle speed is zero and a shift position is a parking position in the manual driving mode.

3. The vehicle control interface according to claim 1, wherein the standby mode is a mode that includes processing which disables a manual shift operation on the vehicle platform.

4. The vehicle control interface according to claim 1, wherein the standby mode is a mode that includes processing which disables a manual accelerator operation on the vehicle platform.

5. The vehicle control interface according to claim 1, wherein the standby mode is a mode that includes processing which disables a manual parking brake release operation on the vehicle platform.

6. The vehicle control interface according to claim 1, wherein:

the vehicle platform includes an air conditioner or an audio system; and the standby mode is a mode that includes processing which disables the manual operation on the air conditioner or the audio system.

7. The vehicle control interface according to claim 1, wherein the standby mode is a mode in which the manual operation received by the vehicle platform is disabled.

8. A vehicle that is configured to be equipped with an autonomous driving system, the vehicle comprising:

a vehicle platform configured to perform autonomous driving according to a command from the autonomous driving system; and a vehicle control interface configured to perform interfacing between the autonomous driving system and the vehicle platform by executing a predetermined application programming interface (API) defined for each of a plurality of signals, wherein:

the vehicle platform is configured to be activated in response to one of a first activation command and a second activation command;

the first activation command is a command transmitted from the autonomous driving system to the vehicle platform via the vehicle control interface;

the second activation command is a command in response to a manual operation on the vehicle platform; and the vehicle control interface is configured to;

when the vehicle platform is activated in response to the first activation command, transition from a manual driving mode to an autonomous driving mode by going through a standby mode in which the manual operation received by the vehicle platform is restricted;

when the vehicle platform is activated in response to the second activation command, transition from the manual driving mode to the autonomous driving mode in response to an autonomous driving transition command from the autonomous driving system; and when the vehicle platform is activated in response to the first activation command,
transition from the manual driving mode to the standby mode after executing an initial diagnosis of the vehicle platform,
maintain the standby mode until having received the autonomous driving transition command, and
transition from the standby mode to the autonomous driving mode in response to receiving the autonomous driving transition command; and the standby mode is a mode in which the vehicle platform renders traveling impossible.

9. The vehicle according to claim 8, wherein the manual driving mode is transitioned to the standby mode when a vehicle speed is zero and a shift position is a parking position in the manual driving mode.

10. The vehicle according to claim 8, wherein the standby mode is a mode in which a manual shift operation on the vehicle platform is disabled.

11. The vehicle according to claim 8, wherein the standby mode is a mode in which a manual accelerator operation on the vehicle platform is disabled.

12. The vehicle according to claim 8, wherein the standby mode is a mode in which the manual operation received by the vehicle platform is disabled.

13. A control method for a vehicle that is configured to be equipped with an autonomous driving system,
the vehicle including:
a vehicle platform configured to perform autonomous driving according to a command from the autonomous driving system; and
a vehicle control interface configured to perform interfacing between the autonomous driving system and the vehicle platform by executing a predetermined application programming interface (API) defined for each of a plurality of signals, the control method comprising:
activating the vehicle platform in response to one of a first activation command and a second activation command, the first activation command being a command transmitted from the autonomous driving system to the vehicle platform via the vehicle control interface, and the second activation command being a command in response to a manual operation on the vehicle platform;

transitioning from a manual driving mode to an autonomous driving mode by going through a standby mode in which the manual operation received by the vehicle platform is restricted when the vehicle platform is activated in response to the first activation command;

when the vehicle platform is activated in response to the second activation command, transitioning from the manual driving mode to the autonomous driving mode in response to an autonomous driving transition command from the autonomous driving system; and when the vehicle platform is activated in response to the first activation command,
transitioning from the manual driving mode to the standby mode after executing an initial diagnosis of the vehicle platform,
maintaining the standby mode until having received the autonomous driving transition command, and
transitioning from the standby mode to the autonomous driving mode in response to receiving the autonomous driving transition command; and the standby mode is a mode in which the vehicle platform renders traveling impossible.

14. The control method according to claim 13, wherein the manual driving mode is transitioned to the standby mode when a vehicle speed is zero and a shift position is a parking position in the manual driving mode.

15. The control method according to claim 13, wherein the standby mode is a mode in which a manual shift operation on the vehicle platform is disabled.

16. The control method according to claim 13, wherein the standby mode is a mode in which a manual accelerator operation on the vehicle platform is disabled.

17. The control method according to claim 13, wherein the standby mode is a mode in which manual operation received by the vehicle platform is disabled.

* * * * *